(12) United States Patent
Hirai et al.

(10) Patent No.: US 7,582,697 B2
(45) Date of Patent: Sep. 1, 2009

(54) SILICONE RUBBER ADHESIVE FILM

(75) Inventors: Kazuo Hirai, Chiba Prefecture (JP);
Hideo Miyazaki, Chiba Prefecture (JP);
Hiroaki Yoshida, Chiba Prefecture (JP);
Noriyuki Suganuma, Chiba Prefecture (JP)

(73) Assignee: Dow Corning Toray Company, Ltd., Tokyo (JP)

( * ) Notice: Subject to any disclaimer, the term of this patent is extended or adjusted under 35 U.S.C. 154(b) by 413 days.

(21) Appl. No.: 11/311,216

(22) Filed: Dec. 19, 2005

(65) Prior Publication Data

US 2006/0142472 A1 Jun. 29, 2006

(30) Foreign Application Priority Data

Dec. 28, 2004 (JP) .............................. 2004-380134

(51) Int. Cl.
*C08K 3/34* (2006.01)
*C08K 5/5425* (2006.01)

(52) U.S. Cl. .................. 524/588; 524/493; 528/15; 528/31; 528/39

(58) Field of Classification Search ................. 524/588, 524/493; 528/15, 31, 39
See application file for complete search history.

(56) References Cited

U.S. PATENT DOCUMENTS

| | | | | | |
|---|---|---|---|---|---|
| 4,082,726 | A | * | 4/1978 | Mine et al. | 528/31 |
| 4,087,585 | A | * | 5/1978 | Schulz | 428/429 |
| 4,122,127 | A | * | 10/1978 | Mikami et al. | 525/477 |
| 4,344,800 | A | | 8/1982 | Lutz | |
| 4,418,165 | A | | 11/1983 | Polmanteer et al. | |
| 4,891,393 | A | * | 1/1990 | Hirai et al. | 523/212 |
| 4,918,126 | A | | 4/1990 | Matsushita et al. | |
| 5,023,288 | A | * | 6/1991 | Hirai et al. | 524/268 |
| 5,391,673 | A | * | 2/1995 | Ekeland et al. | 528/12 |
| 5,756,598 | A | * | 5/1998 | Chung et al. | 525/478 |
| 6,268,416 | B1 | * | 7/2001 | Hirai | 524/92 |
| 6,562,180 | B1 | * | 5/2003 | Bohin et al. | 156/329 |
| 6,940,177 | B2 | * | 9/2005 | Dent et al. | 257/779 |

FOREIGN PATENT DOCUMENTS

| | | |
|---|---|---|
| JP | 61-56255 | 4/1982 |
| JP | 1-197587 | 8/1989 |
| JP | 2-28280 | 1/1990 |

OTHER PUBLICATIONS

English language Abstract for JP 1-197587 extracted from espacenet.com database dated Dec. 15, 2005.
English language Abstract for JP 2-28280 extracted from espacenet.com database dated Dec. 15, 2005.
English language Abstract for JP 57-500738 for JP 61-56255 extracted from epacenet.com database Dec. 15, 2005.

* cited by examiner

*Primary Examiner*—Margaret G Moore
(74) *Attorney, Agent, or Firm*—Howard & Howard Attorneys PLLC

(57) ABSTRACT

A silicone rubber adhesive film comprising a composition formed from; (A) organopolysiloxane gum that has at least two alkenyl groups in each molecule; (B) wet-method hydrophobic reinforcing silica that has a specific surface area of at least 200 $m^2/g$; (C) organohydrogenpolysiloxane that contains at least two silicon-bonded hydrogen atoms in each molecule; (D) mixture or reaction mixture from: (a) organopolysiloxane that has a branched molecular chain structure and that contains at least one silicon-bonded alkenyl group in each molecule and at least one silicon-bonded hydrolyzable group in each molecule, and (b) a silicon-containing compound that contains at least one silicon-bonded epoxy-functional hydrocarbon group and at least one silicon-bonded hydrolyzable group; and (E) curing accelerator.

4 Claims, No Drawings

SILICONE RUBBER ADHESIVE FILM

TECHNICAL FIELD

The invention relates to silicone rubber adhesive films and more particularly relates to a silicone rubber adhesive film that exhibits an excellent adhesive strength.

BACKGROUND ART

Silicone rubber adhesive films are known. For example, Japanese Laid Open Patent Application Numbers (hereinafter Kokai) Hei 1-197587 (equivalent to U.S. Pat. No. 4,918,126) and Kokai Hei 2-28280 (equivalent to U.S. Pat. No. 5,023,288) provide silicone rubber adhesives comprising silicone rubber compositions in which the main components are alkenyl-functional organopolysiloxane gum, organohydrogenpolysiloxane, wet-method hydrophobic reinforcing silica, platinum-type compound catalyst, and adhesion promoter. These silicone rubber adhesives are characterized by simplicity in handling and excellent workability and, when applied to substrates that have smooth surfaces, e.g., glass and metal substrates, can tightly bond these substrates into a single article.

However, there have been problems with these silicone rubber adhesives; for example, oil may exude onto the surface during long-term storage and, depending on the curing conditions, voids may be produced at the interface between the substrate and the cured adhesive layer, resulting in a decline in adhesive strength.

DISCLOSURE OF INVENTION

An object of this invention is to provide a silicone rubber adhesive film that is characterized by excellent handling characteristics, an excellent workability, and an excellent long-term storage stability and by the ability, when applied to any of various adherend substrates, to give a bonded structure that exhibits little variation in adhesive strength.

The present invention relates to a silicone rubber adhesive film comprising a composition formed from
(A) 100 weight parts organopolysiloxane gum that has at least two alkenyl groups in each molecule;
(B) 30 to 150 weight parts wet-method hydrophobic reinforcing silica that has a specific surface area of at least 200 m²/g and that comprises $SiO_{4/2}$ units and siloxane units selected from the group consisting of the $R^1{}_3SiO_{1/2}$ unit, $R^1{}_2SiO_{2/2}$ unit, and $R^1SiO_{3/2}$ unit ($R^1$ in these formulas is $C_{1-10}$ hydrocarbyl or $C_{1-10}$ halogen-substituted hydrocarbyl), in which the molar ratio of the non-$SiO_{4/2}$ siloxane units to the $SiO_{4/2}$ units is 0.08 to 2.0;
(C) 0.1 to 10 weight parts organohydrogenpolysiloxane that contains at least two silicon-bonded hydrogen atoms in each molecule; and
(D) a mixture or reaction mixture from
  (a) organopolysiloxane that has a branched molecular chain structure and that contains at least one silicon-bonded alkenyl group in each molecule and at least one silicon-bonded hydrolyzable group in each molecule, and
  (b) a silicon-containing compound that contains at least one silicon-bonded epoxy-functional hydrocarbon group and at least one silicon-bonded hydrolyzable group, in a quantity such that the weight ratio with respect to component (A) does not exceed 1/5; and
(E) curing accelerator in an amount sufficient to cure the composition comprising components (A) to (D).

The silicone rubber adhesive film according to the invention is characterized by simplicity in handling and excellent workability and by the fact that no oil exudate will appear on its surface even during long-term storage. When applied to adherend substrates, the inventive silicone rubber adhesive film is characterized by its ability to give an adhesion defect-free, strongly bonded structure, due to an absence of defects (e.g., void production within the adhesive or at the adhesion interface) and hence little variation in adhesive strength. As a consequence, the inventive silicone rubber adhesive film is well suited for use as an adhesive or coating for a variety of substrates, e.g., glass, ceramics, metals, plastics, and fibers, in those areas where the aforementioned characteristics are critical, for example, various industries such as the automobile industry, the electrical and electronics industries, and the civil engineering and construction industry.

BEST MODE FOR CARRYING OUT THE INVENTION

This invention will be described in detail hereinbelow. Component (A), which is the base component of the inventive adhesive film, is organopolysiloxane gum that has at least two alkenyl groups in each molecule. This organopolysiloxane gum can be exemplified by organopolysiloxane gum that is represented by the average unit formula $R_eSiO_{(4-e)/2}$ and that has at least two silicon-bonded alkenyl groups in each molecule. R in this formula is $C_{1-10}$ monovalent hydrocarbyl or halogen-substituted monovalent hydrocarbyl, and at least two in each molecule are $C_{2-10}$ alkenyl, e.g., vinyl, allyl, hexenyl. The non-alkenyl groups can be exemplified by $C_{1-10}$ alkyl such as methyl, ethyl, and propyl; cycloalkyl such as cyclohexyl; aralkyl such as beta-phenylethyl; aryl such as phenyl and tolyl; and halogenated alkyl such as chloromethyl, 3-chloropropyl, and 3,3,3-trifluoropropyl. The subscript e in the formula is 1.9 to 2.1.

Component (A) can have a straight-chain or partially branched straight-chain molecular structure, and its characteristics are those of a gum. This component preferably has a degree of polymerization of from 3,000 to 20,000. Its Williams plasticity is preferably at least 50 and more preferably is at least 100.

Component (A) can be a homopolymer or copolymer or can be a mixture of these polymers. The siloxane units that comprise this component can be specifically exemplified by the dimethylsiloxane unit, methylvinylsiloxane unit, methylphenylsiloxane unit, and 3,3,3-trifluoropropylmethylsiloxane unit. The molecular chain terminals of this component are preferably endblocked by a triorganosiloxy group or the hydroxyl group. Groups that may be present at the molecular chain terminals are exemplified by trimethylsiloxy, dimethylvinylsiloxy, methylvinylhydroxysiloxy, and dimethylhydroxysiloxy. Examples of the organopolysiloxane gum under consideration are dimethylvinylsiloxy-endblocked dimethylsiloxane-methylvinylsiloxane copolymer gum, dimethylvinylsiloxy-endblocked dimethylpolysiloxane gum, dimethylhydroxysiloxy-endblocked dimethylsiloxane-methylvinylsiloxane copolymer gum, and methylvinylhydroxysiloxy-endblocked dimethylsiloxane-methylvinylsiloxane copolymer gum.

The wet-method hydrophobic reinforcing silica (B) functions to raise the mechanical strength of the inventive silicone rubber adhesive film composition, both in its uncured and cured state. This component also functions to promote the adhesive performance of the inventive silicone rubber adhesive film and to provide the heat-cured silicone rubber adhesive with adhesiveness, and particularly a durable adhesiveness, for a variety of substrate materials. The BET specific surface area of component (B) is at least 200 m²/g and preferably is at least 300 m²/g. Component (B) can be obtained, for example, by the methods disclosed in Japanese Published Examined Patent Application Number Sho 61-56255 (equivalent to U.S. Pat. No. 4,344,800) and U.S. Pat. No. 4,418,165. Component (B) is incorporated at 30 to 150 weight parts and preferably 50 to 100 weight parts, in each case per 100 weight parts organopolysiloxane (A).

Component (B) is a polysiloxane-like silica with a three-dimensional structure in which the basic structural unit is the $SiO_{4/2}$ unit. It contains organosiloxane units selected from the group consisting of the $R^1_3SiO_{1/2}$ unit, $R^1_2SiO_{2/2}$ unit, $R^1SiO_{3/2}$ unit, and mixtures thereof, in a molar ratio with respect to the $SiO_{4/2}$ units in the range of 0.08 to 2.0. $R^1$ in these formulas is $C_{1-10}$ hydrocarbyl or $C_{1-10}$ halogenated hydrocarbyl. $C_{1-10}$ hydrocarbyl can be exemplified by $C_{1-10}$ alkyl such as methyl, ethyl, and propyl; $C_{2-10}$ alkenyl such as allyl and hexenyl; cycloalkyl such as cyclohexyl; aralkyl such as beta-phenylethyl; and aryl such as phenyl and tolyl. $C_{1-10}$ halogenated hydrocarbyl can be exemplified by $C_{1-10}$ halogenated alkyl such as chloromethyl, 3-chloropropyl, and 3,3,3-trifluoropropyl. Wherein alkyl is preferred among the preceding and methyl is particularly preferred. The quantity of organosiloxane units selected from the group consisting of the $R^1_3SiO_{1/2}$ unit, $R^1_2SiO_{2/2}$ unit, $R^1SiO_{3/2}$ unit, and mixtures thereof should be sufficient to render component (B) hydrophobic, and the molar ratio of the organosiloxane units to $SiO_{4/2}$ units must be in the range of 0.08 to 2.0 and preferably is in the range of 0.1 to 1.5. The bonding performance for substrates declines when this molar ratio is less than 0.08. When this molar ratio exceeds 2.0, the reinforcing performance declines substantially and the functionality sought from a reinforcing filler is not achieved.

The SiH-containing organohydrogenpolysiloxane (C) is a crosslinker for the instant silicone rubber adhesive film composition and can be exemplified by trimethylsiloxy-endblocked methylhydrogenpolysiloxane, trimethylsiloxy-endblocked dimethylsiloxane-methylhydrogensiloxane copolymer, dimethylphenylsiloxy-endblocked methylphenylsiloxane-methylhydrogensiloxane copolymer, cyclic methylhydrogenpolysiloxane, and copolymer comprising the dimethylhydrogensiloxane unit and $SiO_{4/2}$ unit. At least two silicon-bonded hydrogen atoms must be present in each molecule. Component (C) is incorporated at 0.1 to 10 weight parts per 100 weight parts organopolysiloxane (A) and preferably at 0.3 to 5 weight parts per 100 weight parts organopolysiloxane (A).

Component (D) causes the manifestation of an excellent adhesiveness for substrate with which the inventive silicone rubber adhesive film is in contact during its cure. Other characteristics of component (D) are that, due to its good compatibility with the wet-method hydrophobic reinforcing silica (B), it does not exude onto the surface of the silicone rubber adhesive film and it improves the adhesiveness in combination with component (B). This component is a mixture or reaction mixture from (a) organopolysiloxane that has a branched molecular chain structure and that contains at least one silicon-bonded alkenyl group in each molecule and at least one silicon-bonded hydrolyzable group in each molecule, and (b) a silicon-containing compound that contains at least one silicon-bonded epoxy-functional hydrocarbon group and at least one silicon-bonded hydrolyzable group.

The component (a) encompassed by component (D) is organopolysiloxane that has a branched molecular chain structure and that contains at least one silicon-bonded alkenyl group in each molecule and at least one silicon-bonded hydrolyzable group in each molecule. Branched molecular chain structure denotes a partially branched-chain, branched-chain, network, or three-dimensional molecular structure that contains at least one $[RSiO_{3/2}]$ unit or $[SiO_{4/2}]$ unit in each molecule. R in the preceding formula is defined as above. The alkenyl here is exemplified by vinyl, allyl, and hexenyl, among which vinyl is preferred. The hydrolyzable group is exemplified by alkoxy such as methoxy, ethoxy, propoxy, and butoxy and by alkoxyoxyalkyl such as methoxymethoxy, methoxyethoxy, and ethoxyethoxy, wherein alkoxy is preferred and methoxy is the preferred alkoxy.

The component (a) encompassed by component (D) is preferably organopolysiloxane with the following general formula in which the $SiO_{4/2}$ unit is the basic structural unit.

$(R^2R^3_2SiO_{1/2})_a(R^3_3SiO_{1/2})_b(R^3O_{1/2})_c(SiO_{4/2})_d$ $R^2$ in this formula is $C_{2-12}$ alkenyl such as vinyl, allyl, or hexenyl. $R^3$ is non-alkenyl $C_{1-10}$ monovalent hydrocarbyl, e.g., $C_{1-10}$ alkyl such as methyl, ethyl, or propyl; cycloalkyl such as cyclohexyl; aralkyl such as beta-phenylethyl; and aryl such as phenyl or tolyl. $C_{1-10}$ alkyl is preferred among the preceding, and methyl is particularly preferred. The individual $R^3$ groups may be the same as each other or may differ from one another. a and c are numbers greater than or equal to one because a good adhesiveness does not appear at values less than one. b is a number greater than or equal to zero, while (a+b)/c=0.2 to 2. Good adhesiveness again does not appear outside this range. d is a number greater than or equal to three and less than thirty. The molecular weight becomes excessively large when d is greater than or equal to thirty and adhesiveness can no longer appear. d is preferably less than or equal to twenty from the standpoint of the compatibility between this component and component (A). Values of d less than three may result in a reduced compatibility with component (B) and a poor adhesiveness. (a+b+c)/d=0.4 to 4. An excellent adhesiveness is not obtained at less than 0.4, while material in which this relation exceeds 4 essentially cannot be prepared.

The component (b) encompassed by component (D) is a silicon-containing compound that contains at least one silicon-bonded epoxy-functional hydrocarbon group and at least one silicon-bonded hydrolyzable group and is preferably a silicon-containing compound with the formula

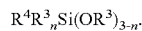
$R^4R^3_nSi(OR^3)_{3-n}$.

$R^4$ in this formula is an epoxy-functional hydrocarbon group and more specifically is a glycidoxy-functional or epoxycyclohexyl-functional hydrocarbon group. $C_{2-6}$ alkyl, such as ethyl, propyl, and butyl, is preferred for the hydrocarbon group to which the glycidoxy or epoxycyclohexyl group is bonded, and glycidoxy- or epoxycyclohexyl-substituted alkyl groups such as gamma-glycidoxypropyl and 3,4-epoxycyclohexylethyl are preferred. $R^3$ is defined as above. n is one or zero. Component (b) is specifically exemplified by gamma-glycidoxypropyltrimethoxysilane, gamma-glycidoxypropylmethyldimethoxysilane, 3,4-epoxycyclohexylethyltrimethoxysilane, and 3,4-epoxycyclohexylethylmethyldimethoxysilane.

The component (a) encompassed by component (D) can be synthesized by already known methods. Synthesis can be carried out, for example, by the cohydrolysis, in the presence of a precisely controlled amount of water, of methyl orthosilicate or ethyl orthosilicate with one or more selections from dimethylvinylchlorosilane, dimethylvinylacetoxysilane, dimethylvinylethoxysilane, divinyltetramethyldisiloxane, trimethylchlorosilane, trimethylacetoxyilane, and hexamethyldisiloxane. The use of an acid catalyst such as hydrochloric acid is recommended for this method. Each of the components cited above may be used in the form of a mixture of two or more species.

With regard to the mixing of components (a) and (b), a reaction mixture is preferably made by carrying out a partial reaction between components (a) and (b) by an alcohol-liberating reaction in the presence of a basic catalyst such as sodium hydroxide, potassium hydroxide, or potassium silanolate. A simple mixture of components (a) and (b) may also be used. When reaction in the presence of a basic catalyst is employed, the system is preferably neutralized post-reaction with, for example, carbon dioxide, a chlorosilane, or acetic acid. The low boilers are also preferably removed to the greatest extent possible by, for example, distillation. The component (a):component (b) mixing ratio must be within the range of 1:10 to 10:1 as the weight ratio and is preferably in the range of 1:2 to 2:1 as the weight ratio. The basis for this range is that values within this range are associated with the appearance of a strong adhesive strength.

Component (D) is incorporated in a quantity that provides a weight ratio with respect to component (A) not in excess of 1/5. When component (D) is added in a quantity that exceeds this, the properties inherent to the composition may be lost and/or the plasticity of the inventive adhesive film may be reduced. In addition, the optimal quantity of addition for obtaining an excellent adhesiveness varies as a function of the structure of the other components, but 0.1 to 10 weight parts per 100 weight parts component (A) is preferred and 0.3 to 5 weight parts per 100 weight parts component (A) is more preferred.

The curing accelerator (E) is a catalyst for curing the composition according to the invention, and a hydrosilylation catalyst, an organoperoxide, or the combination of a hydrosilylation catalyst with an organoperoxide may be used. The hydrosilylation catalyst is exemplified by platinum catalysts, rhodium catalysts, and iridium catalysts. The platinum catalysts can be exemplified by finely divided platinum, platinum black, chloroplatinic acid, platinum tetrachloride, alcohol-modified chloroplatinic acid, olefin complexes of platinum, alkenylsiloxane complexes of platinum, carbonyl complexes of platinum, and thermoplastic organic resin particles (e.g., methyl methacrylate resin, polycarbonate resin, polystyrene resin, silicone) that incorporate a platinum catalyst as described hereinabove. The rhodium catalysts can be exemplified by $[Rh(O_2CC_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)$, $RhX_3[(R^5)_2S]_3$, $(R^6_3P)_2Rh(CO)X$, $(R^6_3P)_2Rh(CO)H$, $Rh_2X_2Y_4$, $H_fRh_g(En)_hCl_i$, and $Rh[O(CO)R^5]_{3-m}(OH)_m$, wherein X in the preceding formulas is the hydrogen atom, chlorine atom, bromine atom, or iodine atom; Y is alkyl (e.g., methyl or ethyl), CO, $C_8H_{14}$, or $0.5C_8H_{12}$; $R^5$ is alkyl, cycloalkyl, or aryl; $R^6$ is alkyl, aryl, alkyloxy, or aryloxy; En is olefin; f is zero or one; g is one or two; h is an integer from one to four; i is two, three, or four; and m is zero or one. The iridium catalysts can be exemplified by $Ir(OOCCH_3)_3$, $Ir(C_5H_7O_2)_3$, $[Ir(Z)(En)_2]_2$, and $[Ir(Z)(Dien)]_2$, wherein Z in the formulas is a chlorine atom, bromine atom, iodine atom, or alkoxy group; En is olefin; and Dien is cyclooctadiene. The hydrosilylation catalyst is incorporated in a quantity sufficient to induce the cure of the composition according to the invention, and a very suitable range is 1 to 500 ppm as the amount of platinum metal per 100 weight parts component (A).

The organoperoxide is exemplified by benzoyl peroxide, o-methylbenzoyl peroxide, m-methylbenzoyl peroxide, p-methylbenzoyl peroxide, t-butyl perbenzoate, dicumyl peroxide, and 2,5-dimethyl-2,5-di(t-butylperoxy)hexane. The organoperoxide is generally incorporated in the range of 0.1 to 10 weight parts. A combination of hydrosilylation catalyst and organoperoxide may also be used.

The adhesive silicone rubber composition that forms the silicone rubber adhesive film according to the present invention itself comprises the components (A) to (E) as described above, but in addition to components (A) to (E) may also incorporate, insofar as the object of the invention is not impaired, the various additives known for use in ordinary silicone rubber compositions. Examples of these additives are other inorganic fillers, pigments, heat stabilizers, and cure retarders for platinum-type catalysts. The other inorganic fillers can be exemplified by diatomaceous earth, quartz powder, calcium carbonate, titanium oxide, carbon black, and iron oxide red; the heat stabilizers can be exemplified by rare earth oxides, cerium silanolate, and the cerium salts of fatty acids; and the cure retarders can be exemplified by acetylenic alcohol compounds, phenyl alcohol compounds, benzotriazole, and methyltris(methylisobutynoxy)silane. When a colored additive is not used in the additive package, the adhesive can be used as a highly transparent silicone rubber adhesive film.

While the adhesive silicone rubber composition that forms the silicone rubber adhesive film according to the present invention itself comprises the components (A) to (E) as described above, this adhesive silicone rubber composition preferably has a Williams plasticity in the range from 300 to 800 in its uncured state and preferably has a green strength of 0.1 to 0.5 MPa at 25° C. When the Williams plasticity is less than 300, the uncured adhesive, when sandwiched and pressed between, for example, a glass substrate and a metal substrate, will be pressed out in large amounts from the compressing surfaces, causing contamination of the surroundings. A Williams plasticity in excess of 800 causes a reduced workability during blending and a reduced processability. A green strength below 0.1 causes problems such as deformation and breaking into pieces during handling. While the handling properties are excellent at above 0.5 MPa, plasticization reversion during storage occurs at such values, which results in a tendency for problems such as excessive hardness, loss of plasticity, and cracking to occur. The heating loss when the adhesive is cured for 30 minutes in a 130° C. oven is preferably no greater than 0.25%. Larger values have a pronounced tendency in the case of cure by oven heating to cause adhesion defects, such as voids and contact defects, within the adhesive itself or at its interface with the substrate.

The adhesive silicone rubber composition that forms the silicone rubber adhesive film according to the present invention is obtained by blending the specified quantities of the above-described components (A) to (E) by mixing and kneading using, for example, a two-roll mill, kneader, or Banbury mixer. To then process the composition into a film, it may be extruded into film form by passage through an extruder equipped with the necessary die; or may be made into a uniform adhesive film by sandwiching between organic resin films (e.g., polyolefin film, polyester film) using calender rolls; or may be molded into a film using a press controlled to 40° C. or less. Among these, continuous molding by lamination between organic resin films using calender rolls is advantageous in terms of production efficiency. The thusly molded silicone rubber adhesive film can be used after the very long roll-wound material has been cut to the required shape with a cutter or punch.

As an example of a method for using the inventive silicone rubber adhesive film, the uncured adhesive, cut to the desired dimensions, may be sandwiched and pressed between the substrates, for example, metal and/or glass, and the two substrates may then be unified into a single article by curing the adhesive by heating for about 5 to 60 minutes at 100° C. to 170° C. in an oven, press, or autoclave while applying a pressure of about 0.1 to 2 MPa and/or drawing a vacuum. The silicone rubber adhesive film according to the present invention, because it contains component (D), is characterized by its ability to resist the production of defects at the adhesion interface, such as lifting and voids, and to give a strongly bonded structure, even when cured at 120° C. or more where void production at the adhesion interface can easily occur.

The silicone rubber adhesive film according to this invention is characterized by ease in handling and by an excellent workability. When applied to adherend substrates, the inventive silicone rubber adhesive film is further characterized by its ability to give an adhesion defect-free, strongly bonded structure, due to an absence of, inter alia, void production within the adhesive or at the adhesion interface and hence little variation in adhesive strength. In addition, because this composition exhibits an excellent adhesiveness in particular for metal and glass and possesses elasticity even after curing, it can be effectively used, for example, as an adhesive for bonding metal substrates to glass substrates. Specific examples here are the adhesive for attaching the inner mirror to the front windshield of an automobile, the adhesive for bonding the metal base for attaching the handles for the glass doors present at building entrances, the adhesive for bonding a glass facade to a frame, and the adhesive for attaching the frame material of window glass.

EXAMPLES

The invention is described in greater detail by the examples that follow, but the invention is not limited by these examples. In the examples, parts denotes weight parts and the Williams plasticity and green strength (tensile strength in the uncured condition) of the adhesive silicone rubber compositions were measured in accordance with JIS K 6249.

Reference Example 1

Divinyltetramethyldisiloxane, hexamethyldisiloxane, and tetramethoxysilane were cohydrolyzed in the presence of a catalytic quantity of hydrochloric acid while removing the evolved methanol. This was followed by neutralization with sodium bicarbonate and removal of the low molecular weight components by heating for 2 hours under reduced pressure to give organopolysiloxane with the following general formula (Vi=vinyl and Me=methyl in the formula).

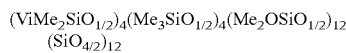

$(ViMe_2SiO_{1/2})_4(Me_3SiO_{1/2})_4(Me_2OSiO_{1/2})_{12}$
$(SiO_{4/2})_{12}$

This organopolysiloxane was subsequently mixed with gamma-glycidoxypropyltrimethoxysilane at a weight ratio of 1:1, followed by reaction for 2 hours at 100° C. in the presence of 500 ppm KOH while removing the evolved methanol. Neutralization with trimethylchlorosilane and removal of the low molecular weight components by heating for 1 hour under reduced pressure then gave a reaction mixture designated as polymer M.

Example 1

The following were introduced into a kneader mixer and were mixed and kneaded for 60 minutes at 180° C.: 100 parts dimethylvinylsiloxy-endblocked dimethylsiloxane-methylvinylsiloxane copolymer gum (degree of polymerization=4,000) composed of 99.63 mole % dimethylsiloxane unit and 0.37 mole % methylvinylsiloxane unit and 75 parts wet-method hydrophobic reinforcing silica (BET specific surface area=540 m$^2$/g) prepared by the method described in Reference Example 2 of Kokai Hei 11-209735 (equivalent to U.S. Pat. No. 6,268,416). After cooling, the following were incorporated into the resulting silicone rubber base on a two-roll mill to give a transparent adhesive silicone rubber composition: 2.0 parts trimethylsiloxy-endblocked methylhydrogenpolysiloxane (silicon-bonded hydrogen content=1.5 weight %) with a viscosity at 25° C. of 7 centistokes, sufficient chloroplatinic acid/tetramethyldivinylsiloxane complex to provide 10 ppm as platinum metal in the composition, 1.0 weight part of the polysiloxane M prepared in Reference Example 1, and methyltris(methylisobutynoxy)silane in a quantity providing 100 ppm in the composition. This silicone rubber composition was sandwiched between two polypropylene films using calender rolls to yield a uniform silicone rubber adhesive film with a thickness of 1 mm.

Measurement on the uncured silicone rubber adhesive film gave a Williams plasticity of 580 and a green strength of 0.3 MPa. The heating loss when heat-cured for 30 minutes in a 130° C. oven was 0.14 weight %. The two polypropylene films were peeled from the silicone rubber adhesive film, which was then sandwiched between a flat glass plate and a stainless steel substrate. Curing was carried out by heating for 30 minutes at 130° C. while applying a pressure of 0.4 MPa with a press. No outflow occurred when this was done, nor were there voids or lifting at the adhesion interface. A unified structure was obtained in which the glass substrate and stainless steel substrate were tightly bonded through the transparent cured product from the silicone rubber adhesive film. The shear adhesive strength of this bonded structure was measured at 6.7 MPa. The silicone rubber adhesive film was also held interposed between the two polypropylene films for 3 months at 10° C., after which the polypropylene film was peeled off and the surface was inspected. No exudate was observed.

Comparative Example 1

A silicone rubber adhesive film was prepared as in Example 1, but in this case using a total of 1.5 parts of a ternary mixture of 0.5 part gamma-methacryloxypropyltrimethoxysilane, 0.5 part gamma-glycidoxypropyltrimethoxysilane, and 0.5 part glycerol monoallyl ether in place of the polymer M prepared in Reference Example 1. The Williams plasticity of the uncured material was 570, and its green strength was 0.3 MPa. The heating loss when heat-cured for 30 minutes in a 130° C. oven was 0.30 weight %. Proceeding as in Example 1, the two polypropylene films were peeled from the silicone rubber adhesive film, which was sandwiched between a flat glass plate and a stainless steel substrate and cured by heating for 30 minutes at 130° C. while applying a pressure of 0.4 MPa with a press. No outflow occurred when this was done, and a unified structure was obtained in which the glass substrate and stainless steel substrate were bonded through the cured product from the silicone rubber adhesive film. However, voids were seen at the adhesion interface, and the shear adhesive strength of this bonded structure was measured at 5.2 MPa, which indicated That which is claimed is:

1. A silicone rubber adhesive film comprising a composition formed from
    (A) 100 weight parts organopolysiloxane gum that has at least two alkenyl groups in each molecule;
    (B) 30 to 150 weight parts wet-method hydrophobic reinforcing silica that has a specific surface area of at least 200 m$^2$/g and that comprises $SiO_{4/2}$ units and siloxane units selected from the group consisting of the $R^1_3SiO_{1/2}$ unit, $R^1_2SiO_{2/2}$ unit, and $R^1SiO_{3/2}$ unit ($R^1$ in these formulas is $C_{1-10}$ hydrocarbyl or $C_{1-10}$ halogen-substituted hydrocarbyl), in which the molar ratio of the non-$SiO_{4/2}$ siloxane units to the $SiO_{4/2}$ units is 0.08 to 2.0;
    (C) 0.1 to 10 weight parts organohydrogenpolysiloxane that contains at least two silicon-bonded hydrogen atoms in each molecule;
    (D) a reaction mixture from
    (a) organopolysiloxane that has a branched molecular chain structure and that contains at least one silicon-bonded alkenyl group in each molecule and at least one silicon-bonded hydrolyzable group in each molecule, said organopolysiloxane having the general formula $(R^2R^3_2SiO_{1/2})_a(R^3_3SiO_{1/2})_b(R^3O_{1/2})_c(SiO_{4/2})_d$ in which $R^2$ is $C_{2-12}$ alkenyl, each $R^3$ independently represents a $C_{1-10}$ monovalent hydrocarbon group excluding alkenyl groups, a and c are numbers greater than or equal to one, b is a number greater than or equal to zero, d is a number greater than or equal to three but less than thirty, (a+b)/c=0.2 to 2, and (a+b+c)/d=0.4 to 4, and
    (b) a silicon-containing compound that contains at least one silicon-bonded epoxy-functional hydrocarbon group and at least one silicon-bonded hydrolyzable group, said silicon-containing compound having the formula $R^4R^3_nSi(OR^3)_{3-n}$ in which $R^3$ is a $C_{1-10}$ monovalent hydrocarbon group excluding alkenyl groups, $R^4$ is a glycidoxy-functional or epoxycyclohexyl-functional hydrocarbon group, and n is one or zero,
    wherein component (D) is incorporated in said composition in a quantity such that the weight ratio of component (D) with respect to component (A) does not exceed 1/5; and
    (E) curing accelerator in an amount sufficient to cure the composition comprising components (A) to (D).

2. The silicone rubber adhesive film of claim 1, in which the silicon-containing compound (b) of component (D) is independently selected from the group consisting of gamma-glycidoxypropyltrimethoxysilane, gamma-glycidoxypropylmethyldimethoxysilane, 3,4-epoxycyclohexylethyltrimethoxysilane, and 3,4-epoxycyclohexylethylmethyldimethoxysilane.

3. The silicone rubber adhesive film according to claim 1, that characteristically has a Williams plasticity of 300 to 800 in its uncured state and a green strength of 0.1 to 0.5 MPa.

4. The silicone rubber adhesive film according to claim 1, that has a heating loss when heat-cured for 30 minutes in a 130° C. oven of not more than 0.25 weight %.

* * * * *

UNITED STATES PATENT AND TRADEMARK OFFICE
CERTIFICATE OF CORRECTION

PATENT NO.       : 7,582,697 B2
APPLICATION NO.  : 11/311216
DATED            : September 1, 2009
INVENTOR(S)      : Hirai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 445 days.

Signed and Sealed this

Fourteenth Day of September, 2010

David J. Kappos
*Director of the United States Patent and Trademark Office*